(No Model.)

J. G. HALLAS.
TIME ALARM.

No. 578,059. Patented Mar. 2, 1897.

WITNESSES
H. A. Lamb
S. V. Richardson

INVENTOR
James G. Hallas
By A. M. Wooster
Atty.

UNITED STATES PATENT OFFICE.

JAMES G. HALLAS, OF WATERBURY, CONNECTICUT, ASSIGNOR, BY DIRECT AND MESNE ASSIGNMENTS, TO THE AMERICAN BRASS NOVELTY COMPANY, OF GRAND HAVEN, MICHIGAN.

TIME-ALARM.

SPECIFICATION forming part of Letters Patent No. 578,059, dated March 2, 1897.

Application filed July 22, 1895. Serial No. 556,714. (No model.)

*To all whom it may concern:*

Be it known that I, JAMES G. HALLAS, a citizen of the United States, residing at Waterbury, in the county of New Haven and State of Connecticut, have invented certain new and useful Improvements in Time-Kettles; and I do hereby declare the following to be a full, clear, and exact description of the invention, such as will enable others skilled in the art to which it appertains to make and use the same.

My invention has for its object the production of a kettle so constructed that articles of food to be boiled may be instantly placed therein and as quickly removed after they have been boiled a predetermined time, which shall be indicated by a clock-movement and also by an alarm, if preferred, both movement and alarm constituting integral parts of the utensil.

With this end in view I have devised the novel time-kettle of which the following description, in connection with the accompanying drawings, is a specification, numbers being used to designate the several parts.

Figure 1:
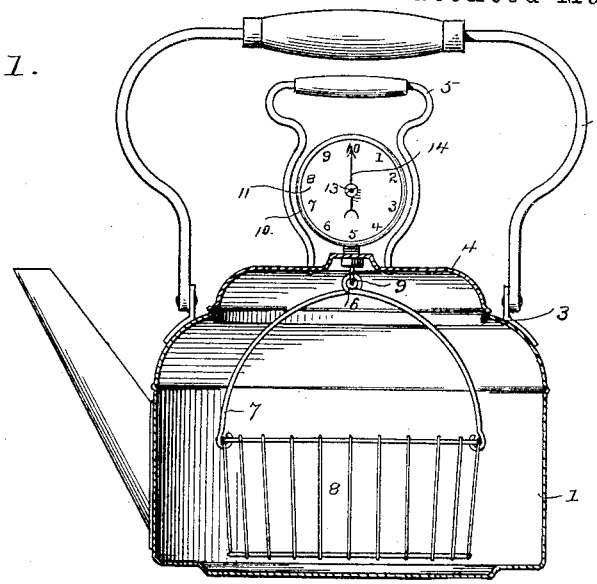
Figure 2:
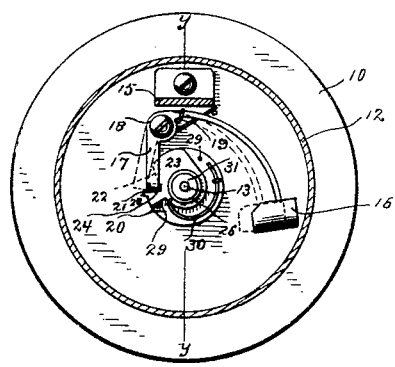
Figure 3:
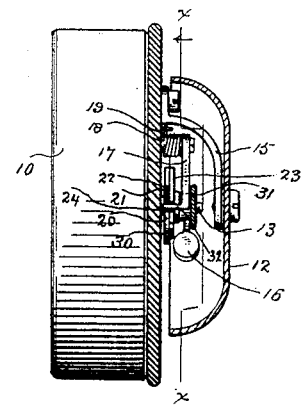
Figure 4:
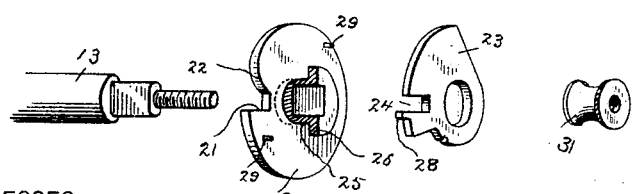

Figure 1 is a section of my novel time-kettle, showing the basket in place; Fig. 2, a section on the line *x x* in Fig. 3; Fig. 3, a section on the line *y y* in Fig. 2; and Fig. 4 is a detail perspective of one end of the time-shaft, showing the parts carried thereby detached.

1 denotes a kettle, which may be of any ordinary or preferred construction and which is provided with a handle 2 and an opening 3 in the top, which is covered by a lid 4, provided with a handle 5. Upon the under side of the lid at the top is a hook 6, which is adapted to receive the handle 7 of a basket 8. This basket is ordinarily made of wire, and its handle is provided with an eye 9, which permits its ready attachment to and detachment from hook 6. Upon the top of the lid I place a case 10, which contains a clock movement and is provided on the front side with a dial 11 and upon the opposite side with a gong 12.

I have not illustrated or described the clock-movement for the reason that so far as my present invention is concerned any clock-movement that may be wound by partial rotation of its shaft in one direction and will carry the shaft in the opposite direction at the desired rate of speed when released will accomplish the purpose of my invention.

In the present instance I have shown a dial graduated from "1" to "10," and of course use in connection therewith a clock-movement that will produce an entire revolution of its shaft in ten minutes.

13 denotes the time-shaft, which is controlled by a clock-movement. (Not shown.) This shaft carries at its front end a pointer 14 and at its rear end mechanism for sounding the gong when a predetermined time for which the pointer has been set shall have expired. The gong is carried by a bracket 15, secured to the back of the case, and is sounded by a striker 16, carried by one arm of a bell-crank lever 17, pivoted on a stud 18, extending from the back of the case, a spring 19 acting to throw the striker to the striking position, as will be more fully explained. At the rear end of the shaft, outside of the case and under the gong, is rigidly secured a disk 20, having a notch 21, one edge of which is straight and the other inclined, as at 22.

23 denotes a segment whose periphery corresponds with the periphery of the disk and which is provided with a notch 24, which is straight on both sides and is adapted to register with notch 21. Notches 21 and 24 are adapted to be engaged by a lug 32 on the arm of the bell-crank lever which does not carry the striker, the straight rear walls of said notches acting to prevent backward movement of the pointer, shaft, &c., from the starting-point, that is, as in Fig. 1. Upon one side of notch 24 and in continuation of the wall thereof is a lug 28, the purpose of which will presently be explained. The segment oscillates freely on a sleeve 25, which is rigidly secured to the disk and is provided with a flange 26, which retains the segment in place. The oscillation of the segment is limited by pins 29, extending outward from the disk. A spring 30, carried by the disk, acts to retain the segment in its normal position, that is, the position in which notch 24 registers with notch 21. The disk, sleeve, and segment are shown as retained in position on the shaft by a thumb-nut 31.

The operation is as follows: Suppose that it is required to boil any article of food, for example, eggs, three minutes. The water in the kettle should of course be boiling. The eggs are placed in the basket, the pointer turned toward the right to the numeral "3," the lid with the basket suspended therefrom is placed in the kettle, and the pointer is released. The normal position of the alarm mechanism, that is, the inoperative position, is clearly shown in dotted lines in Fig. 2. When the pointer is moved toward the right in setting, the mainspring of the clock-movement (not shown) is wound thereby sufficiently to return the shaft to the normal position. The movement of the pointer and shaft in setting of course carries the disk forward also, the movement of the disk being toward the left, as seen in Fig. 2. When the disk commences to move, lug 32 will ride out of notch 21 and up incline 22. The segment also is carried along by the lug until the lug is thrown out of notch 24 in the segment by the incline on the disk. The instant lug 32 is disengaged from notch 24 spring 30 will act to return the segment to its normal position. When the return movement of the shaft and disk takes place, lug 32 instead of riding down incline 22 will be held out of notch 21 by the periphery of the segment until it has reached notch 24 in the segment, which, as already stated, normally registers with notch 21 in the disk. When the lug has reached notch 24, spring 19 will throw the bell-crank lever from the position shown in dotted lines in Fig. 2 to the position shown in full lines and will throw the striker against the gong, thereby sounding the alarm to indicate that the predetermined time has expired.

Should it be required to boil any article for the full ten minutes for which the time-movement may be set, the pointer would be moved toward the right from the starting-point entirely around the dial until it registered with the numeral "10." Lug 32 upon the bell-crank lever would be prevented from dropping into notch 21 in the disk by the engagement of lug 32 with lug 28 on the segment. This position of the parts is not shown in the drawings, but it is obvious that lug 32 would rest on the periphery of the segment back of lug 28, thus rendering it impossible for lug 32 to drop into the notch in the disk. After the engagement of the lugs the segment would of course move forward until its movement was stopped by engagement with the pin 29, with which it is not in engagement in Fig. 2.

With this device it will be readily understood that a number of the utensils can be employed without danger of confusing the mind as to which one is to be removed from the stove. The indicator or alarm is always present on the kettle when in use, and the pointer or alarm of that particular kettle not only gives notice of the expiration of the time, but also which one of a possible number of kettles is to be removed from the stove or have its basket removed. This is a particular advantage to those persons having charge of the cooking in a hotel or restaurant.

Having thus described my invention, I claim—

1. In a utensil of the character described the combination with a case, a dial and a gong, of a time-shaft journaled in the case and having at one end a pointer and at the other end a disk having a notch 21 inclined on one side, an oscillating segment having a notch 24, a spring 30 acting on the segment, a bell-crank lever one arm of which carries a striker and the other a lug adapted to register with the notches and a spring 19 acting on the bell-crank lever so that when the time-shaft and disk are rotated in setting the pointer, the lug will ride up the incline and out of the notches after which spring 30 will return the segment to its normal position and in the return movement the lug will ride on the periphery of the disk until the lug registers with both notches when spring 19 will throw the lug into the notches and the striker against the gong.

2. In a utensil of the character described the combination with a case, a dial and a gong, of a time-shaft journaled in the case and having at one end a pointer and at the other end a disk having a notch 21 inclined on one side and on its face pins 29, an oscillating segment whose periphery corresponds with the periphery of the disk and which is provided with a notch 24 and a lug 28, a spring 30 acting on the segment whose oscillation is limited by the pins, a bell-crank lever one arm of which carries a striker and the other a lug adapted to register with the notches at the expiration of the time for which the pointer has been set and with lug 28 should the pointer, shaft and disk be turned entirely around in setting and a spring 19 acting on the bell-crank lever substantially as described for the purpose set forth.

In testimony whereof I affix my signature in presence of two witnesses.

JAMES G. HALLAS.

Witnesses:
 JAMES E. HALLAS,
 GEO. C. NUTTALL.